Nov. 27, 1956 J. NEUHAUS ET AL 2,771,978
DEVICE FOR ORIENTING AND FEEDING DISK-LIKE MEMBERS
Filed May 12, 1952 2 Sheets-Sheet 1

INVENTORS
J. Neuhaus + F. W. Neuhaus
BY
ATTYS.

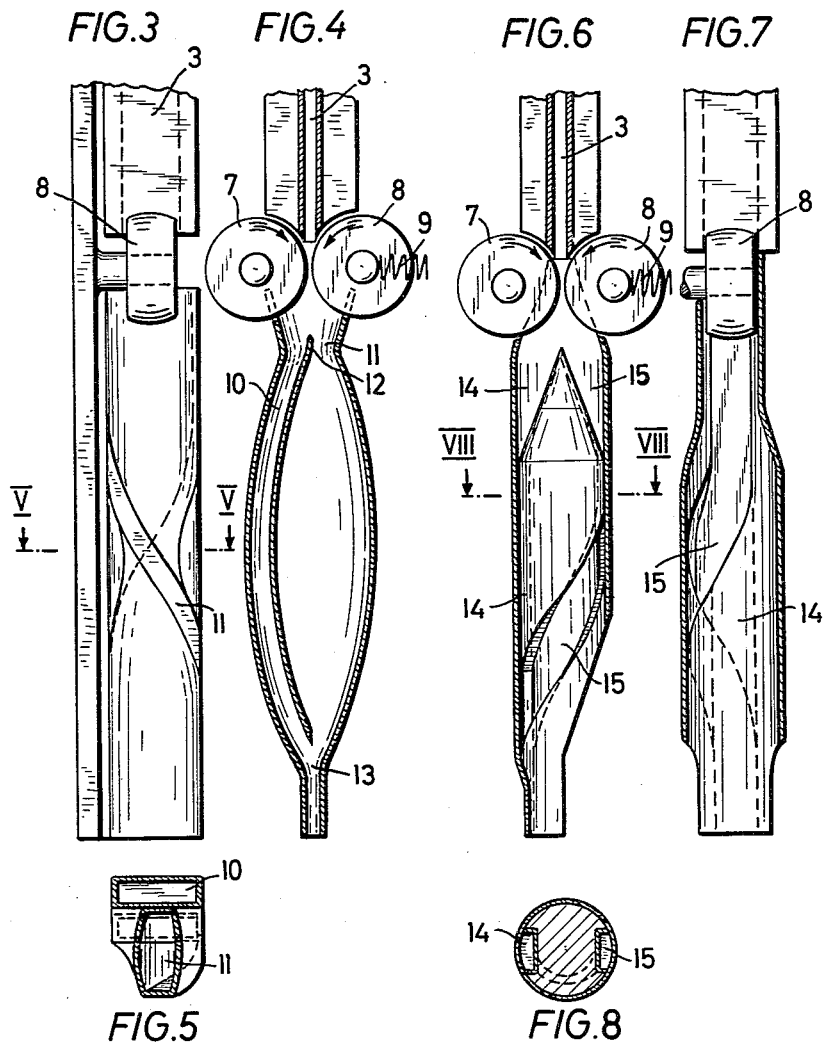

United States Patent Office

2,771,978
Patented Nov. 27, 1956

2,771,978

DEVICE FOR ORIENTING AND FEEDING DISK-LIKE MEMBERS

Julius Neuhaus and Friedrich Wilhelm Neuhaus, Koln-Kalk, Germany

Application May 12, 1952, Serial No. 287,392

2 Claims. (Cl. 193—43)

This invention relates to a device for automatically machining disk-like members, in particular blanked washers, by means of turning diameter and chamfering.

It is usual to manufacture washers by punching out. The blanks thus obtained are partly more or less convex and have the circumferential edge forced out of the proper plane of the washer due to the blanking operation. Such blanks often can not be utilised because of the convexity and non-uniformity of the edge forced out. There is a demand for washers accurate to size as well as reliably and uniformly chamfered. For machining washers of said type it is necessary to feed them towards the cutting tools with always the same supporting surface and to always chamfer the place where the circumferential edge has already been displaced due to forcing out during the blanking operation. For said purpose the washers have to be selected carefully. Selection hitherto was a manual operation requiring much time and skill. Devices of prior art, such as testing by means of a mandrel or the like, not only render the operation more difficult, but also are too unreliable.

According to the invention, disk-like members, in particular washers, being concentrically turned as to diameter as well as accurately chamfered can be produced. In accordance with the invention a selecting means for the disk-like members is provided by means of which said members are fed towards the machining tools always in the same position. Moreover, means are provided which are adapted to automatically chuck, machine, and discharge the disk or washer. The selecting means is constituted by two oppositely rotating selecting rolls, which are followed by a separator co-operating with channels extending to the machining tools, one of said channels being provided with a reversing means. The selecting rolls which the washers are supplied to are mounted in a distance corresponding to the thickness of the washers and are preferably spring pressed towards one another. The reversing means comprises a chute or track in the form of a spiral, wherein the two guide channels are positioned in a common housing.

Said guide channels extend to a holding means which feeds the washers to the machining place, preferably by means of a centering mandrel. The cylindrical turning of circumferential diameter and the chamfering of the washer is preferably effected by means of tools which rotate against the periphery of the non-rotating washer. Said tools are radially adjustable by means of levers the control of which is effected by a longitudinally displaceable cam.

The device according to the invention includes the advantages of simplicity and reliability. The selecting operation takes place continuously and automatically in a reliable manner so that a high efficiency can be achieved. Any manual operation is thus rendered unnecessary. The selecting rolls may be designed dependently on type and size of washers to be machined. For instance the rolls may be turned with cambered circumferential surfaces and rolls of different diameters may be interchanged at the same device. It is preferred to provide one selecting roll with a cambered circumferential surface, whereas the opposite roll has a cylindrical one. The passing of the washer between the rolls effects that, dependent on the position of the washer, i. e. as to the convexity of washer or the edges displaced by blanking, the washer will either be moved towards the one or other side, the washer remaining in its original position or being moved into said position by a reversing means. As a result, the washers always contact the machining tools in proper positions for effective machining.

Several embodiments of the invention are shown in the accompanying drawings, in which Fig. 1 and 2 show a front and side view, respectively, of an embodiment according to the invention;

Figs. 3, 4 and 5 show two different views and a sectional view on the line V—V of Fig. 3, respectively, of an embodiment of the reversing means;

Figs. 6, 7 and 8 show another embodiment of a reversing means;

Figure 1:
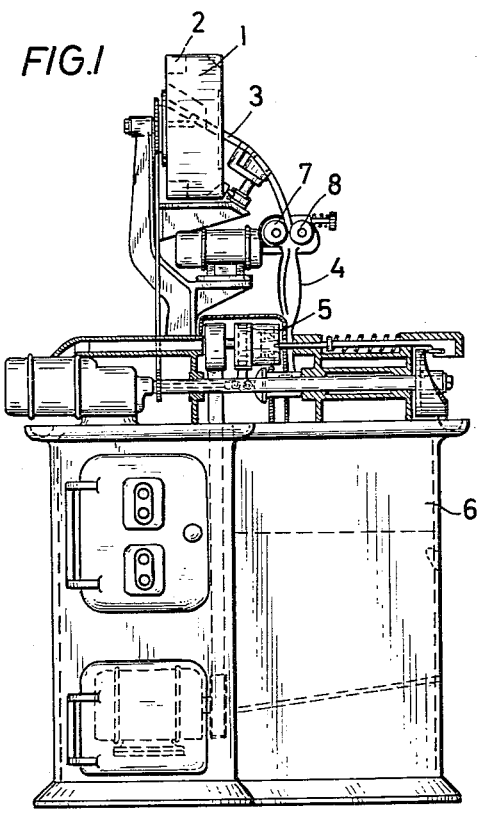
Figure 2:
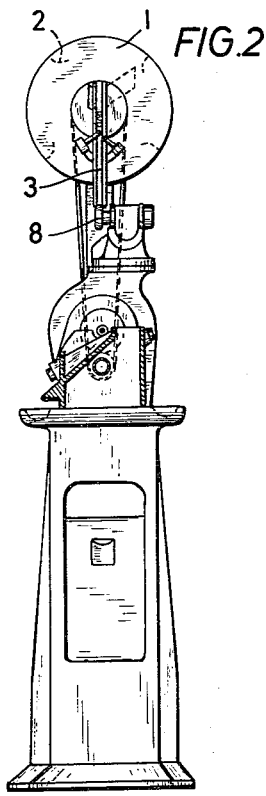
Figure 9:
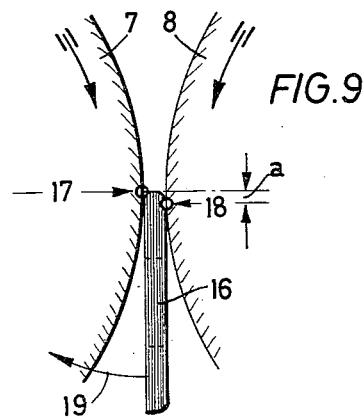
Fig. 9 illustrates the mode of operation when passing the washer between the selecting rolls.

The device according to the invention for automatic sorting and machining the disk-like members or washers substantially comprises the following parts: a rotating supply drum 1 to which the blanks punched out are fed, and which is provided with gripping portions 2 for the purpose of feeding the blanks to a chute or track 3, a means 5 for machining the sorted washers by turning their peripheries and chamfering them from one side, and a base portion 6 supporting said means.

The selecting means substantially comprises two oppositely rotating hard faced selecting rolls 7 and 8, at least one of which is forced toward the other by a spring 9. The chute or track 3 extends to the selecting rolls from which they are delivered to the sorting chutes 10 and 11. A separator 12 defines the guide chute 10 through which the washers fall in the position in which they leave the rolls from the other chute 11 which constitutes a reversing means of helical form.

In the embodiment as shown in Figs. 3–5 the two chutes 10 and 11 diverge laterally from the top of the separator 12. In the chute 10 the washer slides down to an outlet end 13 without changing its position. In the chute 11 there is mounted a helical passage, through which washers occupying a reversed position are rotated about their vertical axes 180° while passing through the chute, so that they at the end of the spiral will occupy the like positions as the washers which have passed chute 10.

The reversing means as shown in Figs. 6–8 differs from the reversing means according to Figs. 3–5 only inasmuch as chute 14 extends vertically downwards, whereas another chute 15 extends helically within the cylindrical part of chute 14 until it joins the channel 14. The sorting operation is done by the selecting rolls 7 and 8. By punching out there are obtained disk-like blanks 16 having at one face a sharp-edge 17 and another edge 18 which is rounded off. Said rim rounded off is sufficient to cause the washer when passing intermediate the rolls 7 and 8 to be discharged selectively into the one chute or into the other chute and there reversed.

In the embodiment shown in Fig. 10 the roll 8 engages the washer for a distance $a$ deeper than the roll 7. Therefrom a moment results which moves the washer in direction of arrow 19, i. e. that all washers having the position of washer 16 will be discharged into channel 10, whereas washers occupying the reversed position will be discharged into the other channel, so that said last mentioned washers will be moved ultimately by the reversing means into the position of first-named washers. The direction of discharge of washer is defined by pressure and velocity of the selecting rolls. The same effect will be obtained if the disk-like blanks are more or less convex at one side.

The washers sorted in the manner described come from the selecting means to a suitable chucking device which completes the finishing of the washers.

It will, of course, be understood that various details of construction may be varied through a wide range without departing from the principles of this invention and it is, therefore, not the purpose to limit the patent granted hereon otherwise than necessitated by the scope of the appended claims.

We claim:

1. Means for presenting successive punched out disk blanks each having a sharp circumferential edge on one face and a transversely rounded circumferential edge on the other face to a finishing machine in such fashion that the respective faces of all the disk blanks will be located in the same position for action by the machine, said means including a pair of hard faced cylindrical and oppositely rotatable feed rolls, said feed rolls being mounted on parallel, horizontal axes, means resiliently urging said rolls toward each other to form a bight, means for delivering successive blanks to the bight between said feed rolls, means driving said feed rolls, a pair of vertically extending guide chutes having a common inlet disposed beneath and immediately adjacent said feed rolls and a common outlet, said inlet being of substantial cross-sectional area, separator means in said inlet located beneath, parallel to and intermediate the axes of said rolls, one of said rolls engaging each successive disk blank at its sharp circumferential edge and the other roll engaging the disk blank at the inner terminal of said curved edge and inwardly of its circumferential edge upon final passage of the disk blank from between the rolls thereby causing the blank to be positively swung about a point on its sharp circumferential edge toward the adjacent roll for entry into one of said guide chutes, whereby the successive disk blanks are positively delivered to the separate guide chutes in accordance with the relation of the sharp and rounded edges thereof to the separate feed rolls, and means in one of said chutes for rotating the disk blanks delivered thereto through angles of 180° in their passage to said common outlet from which all blanks are discharged in the same order.

2. The combination as set forth in claim 1 wherein said pair of guide chutes comprises a vertical passage and a helical passage having its lower end communicating with said vertical passage.

References Cited in the file of this patent

UNITED STATES PATENTS

| | | |
|---|---|---|
| 613,349 | Woodland | Nov. 1, 1898 |
| 736,622 | Olin | Aug. 18, 1903 |
| 841,471 | Vallentine | Jan. 15, 1907 |
| 1,524,829 | Koehler | Feb. 3, 1925 |
| 1,669,087 | Hungerford | May 8, 1928 |
| 1,899,221 | Ward et al. | Feb. 28, 1933 |